United States Patent [19]

Mehadji et al.

[11] Patent Number: 5,187,761
[45] Date of Patent: Feb. 16, 1993

[54] METHOD OF MAKING AN INLET CONE ON A CONNECTION ENDPIECE FOR OPTICAL FIBERS, AND APPARATUS FOR PERFORMING THE METHOD

[75] Inventors: Kada Mehadji, Brelevenez; André Mathern, Lannion; René Le Penven, Ploumilliau, all of France

[73] Assignee: France Telecom, France

[21] Appl. No.: 702,919

[22] Filed: May 20, 1991

[30] Foreign Application Priority Data

May 22, 1990 [FR] France .................. 90 06366

[51] Int. Cl.$^5$ ............................................. G02B 7/00
[52] U.S. Cl. ............................................. 385/76; 65/54
[58] Field of Search ............... 350/96.20, 96.21, 96.22, 350/320; 385/76–78, 84, 85, 147; 65/54

[56] References Cited

U.S. PATENT DOCUMENTS

| | | | |
|---|---|---|---|
| 3,715,197 | 2/1973 | Nalepka | 65/54 |
| 3,944,328 | 3/1976 | Kent et al. | 385/53 |
| 4,135,902 | 1/1979 | Oehrle | |
| 4,289,374 | 9/1981 | Franken et al. | 350/96.20 |
| 4,396,247 | 8/1983 | Simon et asl. | 350/96.20 |
| 4,458,983 | 7/1984 | Roberts | 350/96.20 |
| 4,898,450 | 2/1990 | Jannson et al. | 350/96.21 |
| 4,902,095 | 2/1990 | Baker et al. | 350/96.21 |

FOREIGN PATENT DOCUMENTS 2117961 7/1972 France .
0589116 1/1983 Japan .

Primary Examiner—Akm E. Ullah
Attorney, Agent, or Firm—Blakely, Sokoloff, Taylor & Zafman

[57] ABSTRACT

A method of making an inlet cone at one of the ends of a connection endpiece for optical fibers, the endpiece being in the form of a cylindrical rod of outside diameter D and including an internal capillary of diameter $d_i$, the method consisting in providing the end of the connection endpiece with a guide part constituted by a cylindrical body having formed therein: firstly a cylindrical bore of diameter substantially equal to the diameter D of the endpiece, which bore is delimited inside the cylindrical body by a wall constituting an abutment for the end of the endpiece when the endpiece is inserted into the bore; and secondly a guide hole having at least one tapering portion opening to the outside of the cylindrical body with a diameter that is greater than the diameter $d_i$, and opening into the cylindrical bore at the capillary with a diameter which is substantially equal to the diameter $d_i$ of the capillary. The invention is applicable both to monomode and to multimode optical fibers.

4 Claims, 3 Drawing Sheets

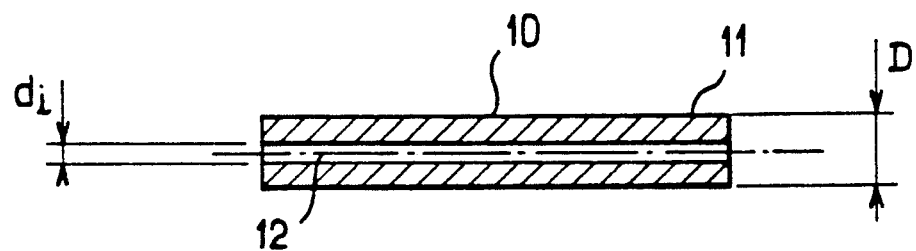
FIG_1
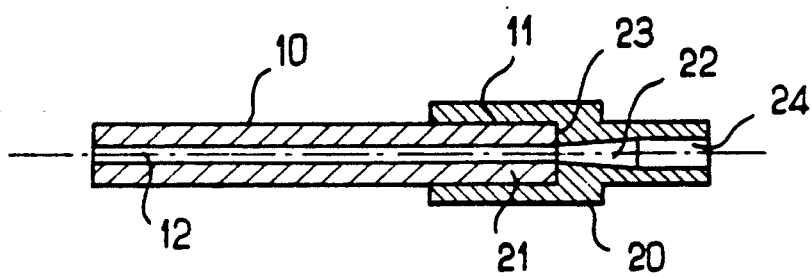
FIG_2
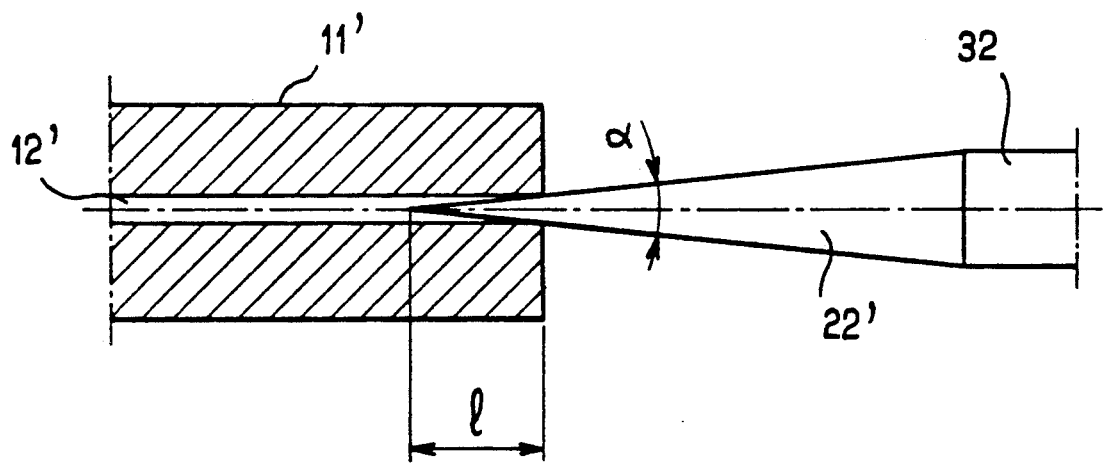
FIG_3

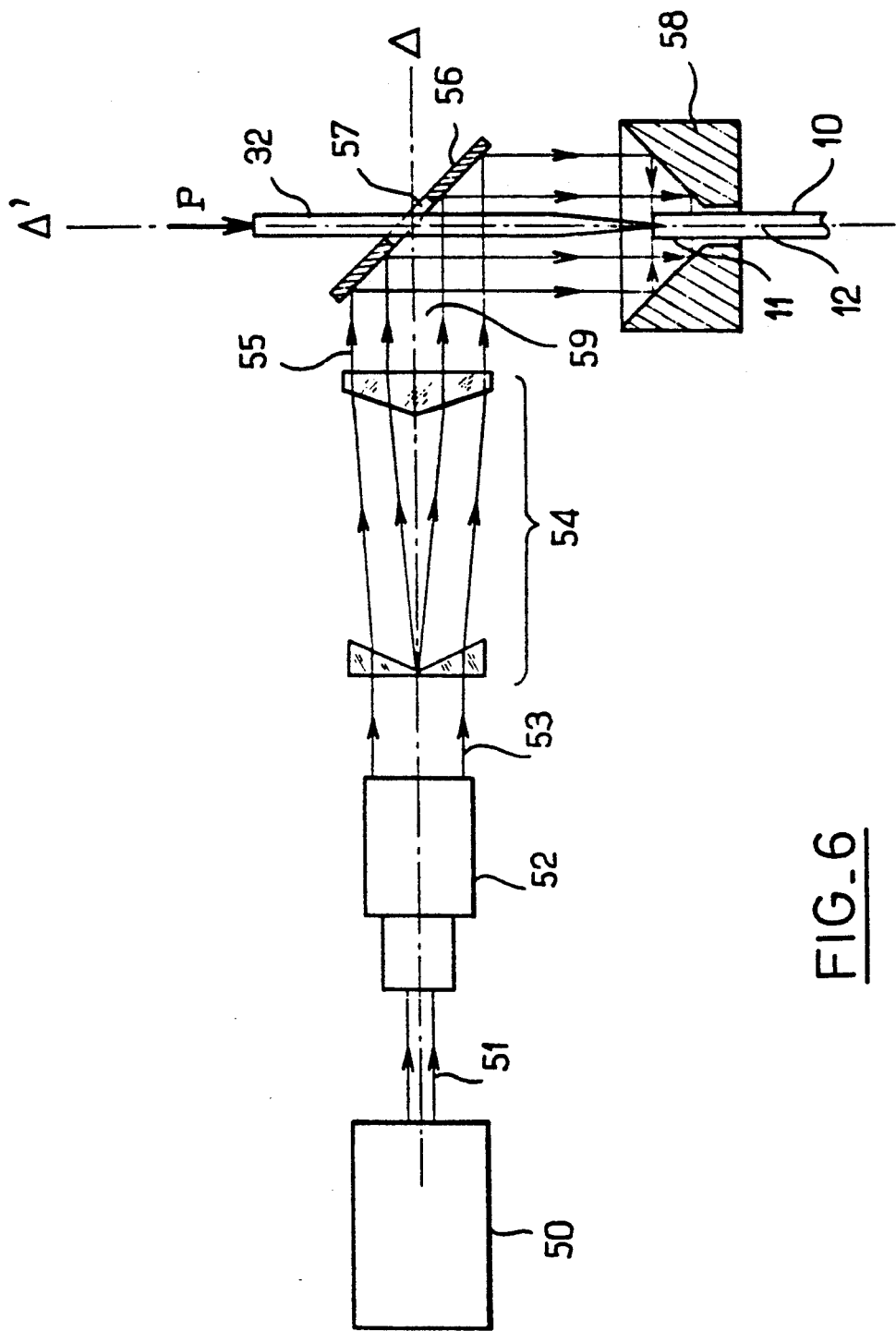
FIG_6

METHOD OF MAKING AN INLET CONE ON A CONNECTION ENDPIECE FOR OPTICAL FIBERS, AND APPARATUS FOR PERFORMING THE METHOD

The present invention relates to a method of making an inlet cone at one of the ends of a connection endpiece for optical fibers, said endpiece being in the form of a cylindrical rod of outside diameter D, and including an internal capillary of diameter $d_i$. The invention also relates to an apparatus for performing a particular implementation of the method of the invention.

BACKGROUND OF THE INVENTION

A particularly advantageous application of the invention lies in the field of techniques for connecting optical fibers, both multimode and monomode.

The use of connection endpieces is becoming more and more commonplace in connectors for optical fibers. This type of device considerably simplifies the problem of assembling and positioning the fiber in the connection member. Also, although the cost of endpieces remains relatively high, they now provide full satisfaction to users and it is to be expected that the use thereof will continue to grow in the future.

At present, nearly all optical fiber connection endpieces are made of ceramics, and in particular of zirconia. Nevertheless, French patent application No. 90 01 300 (not yet published), teaches a method of making connection endpieces out of silica by fiber-drawing, which method is suitable for directly obtaining very high geometrical accuracy (inside diameter, outside diameter, concentricity), at low cost, with excellent mechanical strength and with surface states that are considerably better than those obtained by extruding and machining ceramic endpieces.

However, making the inlet cone of the endpiece for facilitating insertion of the optical fiber into the capillary requires machining that is slow, very difficult, and expensive, and which requires strict and expensive quality control.

Thus the technical problem to be solved by the present invention is to provide a method of making an inlet cone at one of the ends of a connection endpiece for optical fibers, said endpiece being in the form of a cylindrical rod of outside diameter D, and including an internal capillary of diameter $d_i$, the method making it possible to make said inlet cone at low cost while still satisfying the accuracy requirements of optical fiber connection technology.

SUMMARY OF THE INVENTION

According to the present invention, one solution to the technical problem posed is remarkable in that said method consists in providing said end of the connection endpiece with a guide part constituted by a cylindrical body having formed therein: firstly a cylindrical bore of diameter substantially equal to the diameter D of the endpiece, which bore is delimited inside said cylindrical body by a wall constituting an abutment for the end of said endpiece when the endpiece is inserted into said bore; and secondly a guide hole having at least one tapering portion opening to the outside of the cylindrical body with a diameter that is greater than the diameter $d_i$, and opening into the cylindrical bore at said capillary with a diameter which is substantially equal to the diameter $d_i$ of the capillary.

This method is suitable for any type of connection endpiece regardless of the material from which it is made: silica, ceramic, . . . .

In an advantageous implementation of the method of the invention, said guide part is made by being molded around a core provided with a hole and representing said end of the connection endpiece including its capillary, together with a calibrated needle having at least a tapering portion inserted into the hole representing the capillary and being kept in abutment against the core at the open end of said hole.

According to the present invention, another solution to the technical problem posed consists in a method of making an inlet cone at one of the ends of a connection endpiece for optical fibers, said endpiece being in the form of a cylindrical rod of an outside diameter D and including an internal capillary of diameter $d_i$, wherein said end is subjected to laser radiation so as to soften the material from which said endpiece is made, and wherein a needle having at least a tapering portion is inserted into said capillary over a determined distance and under controlled heating and pressure.

This particular implementation of the method of the invention is more specifically suitable when the material of the endpiece is silica, in which case provision is made for the laser radiation to be delivered by a $CO_2$ laser.

Finally, an apparatus for implementing the laser radiation implementation comprises along a first optical axis $\Delta$: a source of laser radiation, a beam expander, an annular beam expander providing an annular beam, and a plane mirror disposed at 45° to the first optical axis $\Delta$ and receiving said annular beam about a central hole whose center lies on the first optical axis $\Delta$; the annular beam being reflected along a second optical axis $\Delta'$ perpendicular to the first optical axis $\Delta$ and passing through the center of said central hole, the beam being reflected towards a conical optical component which deflects the annular beam from the plane mirror onto the said end of the endpiece, which endpiece is placed in the center of said optical component along the second axis $\Delta'$, and further comprises a needle also disposed on the second optical axis $\Delta'$, passing through the central hole of the plane mirror, and applied with controlled pressure into the capillary of the endpiece.

BRIEF DESCRIPTION OF THE DRAWINGS

Implementations of the invention are described by way of example with reference to the accompanying drawings, in which:

FIG. 1 is a section through a connection endpiece without an inlet cone;

FIG. 2 is a section through the FIG. 1 connection endpiece fitted with a guide part having an inlet cone;

FIG. 3 is a fragmentary section view through a mold for making the guide part of FIG. 2;

FIG. 6 is a diagram of apparatus for implementing the method shown in FIGS. 4 and 5.

DETAILED DESCRIPTION

Figure 4:
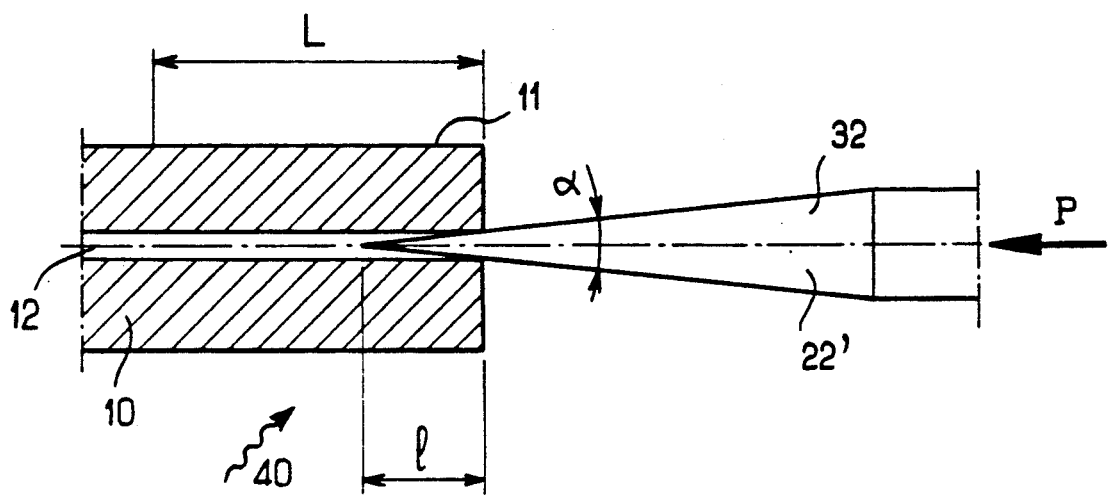
FIG. 4 is a section through one end of a connection endpiece and a tapering needle presented to the inlet to the capillary in the endpiece.

FIG. 1 is a section through a connection endpiece 10 for optical fibers, which endpiece may be made, for example, by the technique described in French patent application No. 90 01 300 in which a tube of silica is fiber-drawn. The outside diameter D of the endpiece 10 is about 2 mm and the inside diameter $d_i$ of its capillary 12 is about 126 μm, and these diameters are accurately defined to within a tolerance of ±0.5 μm. They are maintained coaxial to within a range of 0 to 0.5 μm.

The capillary 12 is designed to receive an optical fiber (not shown) whose diameter is slightly less than $d_i$. When adhesive is used to hold the fiber in place, the core of the fiber is automatically centered relative to the capillary and consequently also relative to the outside diameter D of the connection endpiece 10. The advantage of a connection endpiece is that it makes it as simple as possible to center the fiber in the capillary, which is why devices of this nature are presently becoming widespread.

The operation of inserting the fiber into the capillary is facilitated when one of the ends 11 of the endpiece 10 is provided with an inlet cone 22 suitable for receiving the fiber and guiding it into the capillary 12. To this end, and as shown in FIG. 2, the end 11 of the endpiece 10 is provided with a guide part 20 constituted by a cylindrical body in which a cylindrical bore 21 is provided of diameter substantially equal to the outside diameter D of the connection endpiece 10. Inside said cylindrical body 20, the cylindrical bore 21 is delimited by a wall 23 constituting an abutment for the end 11 of the endpiece 10 when the endpiece is inserted into said bore 21. The cylindrical body 20 also includes a guide hole 24 having at least one tapering portion 22 opening out to the outside of the guide part 20 via a diameter which is greater than the diameter $d_i$, and opening out into the cylindrical bore 21 level with the capillary 12 via a diameter which is substantially equal to the diameter of the capillary.

FIG. 3 shows a portion of a mold for making the guide part 20 of FIG. 2 by molding a thermoplastic material such as a polyamide or polyphenylene sulfide. The mold essentially comprises a core 11' provided with a hole 12' representing the end 11 of the endpiece including its capillary 12, together with a needle 32 formed with a tapering point 22'. In FIG. 3, the needle 32 is shown in its working position, i.e. in abutment against the core 11' and penetrating into the hole 12', with the needle being put into this position by a suitable mechanism that exerts a calibrated force, the tip of the needle 32 being received in said hole 12'. The angle α at the tip of the needle may be 12°, for example. This enables the tip of the needle to penetrate a distance l of about 0.6 mm into the hole 12'.

The needle 11' used in the mold has the same dimensional characteristics as the connection endpiece 10, however its design dimensions could be altered should that be necessary. Such alterations could possibly relate to differing amounts of shrinkage in the molded part.

The guide part 20 is firmly mounted on the endpiece 10. The clamping resulting from the endpiece being received therein is generally sufficient, but if necessary, glue could be added.

Its outside shape need not be specified in greater detail. It is up to the user to determine desirable shapes as a function of the environment of the endpiece.

Figure 5:
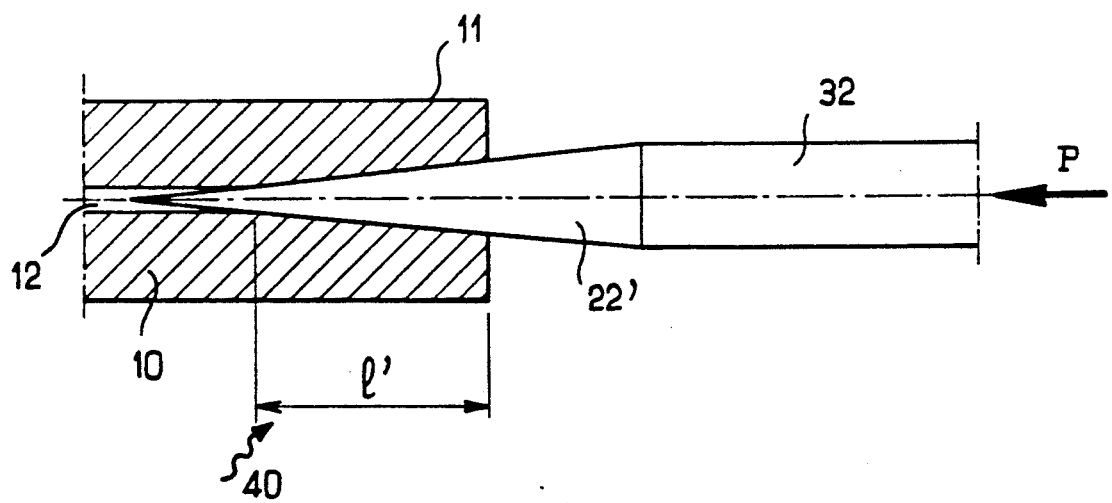
FIG. 5 is a view similar to FIG. 4 showing the needle engaged further into the capillary.

FIGS. 4 and 5 show a method of making the inlet cone 22 to the endpiece 10 which is more specifically intended for use with connection endpieces made of silica and which is based on the idea of directly altering the end 11 of the endpiece so as to obtain a tapering shape by flaring out the capillary 12. In general, this method uses laser radiation 40 for softening the material from which the endpiece 10 is made, with a needle 32 having a taper 22' being inserted into the capillary 12 over a specified distance l'.

Given the required dimensional accuracy of about 0.5 μm. the conditions under which this method is performed must be under good control to avoid disturbing the accuracy of the endpiece, and in particular its inside diameter, and in order to ensure that the tapering portion runs into the capillary without necking. Thus the insertion pressure P applied to the needle must be accurately controlled as must the temperature and the location of the heating in order to avoid material shrinkage phenomena due to creep.

With silica endpieces, a $CO_2$ laser is particularly suitable since its 10.6 μm radiation is well absorbed by silica. By way of example, the end 11 of the connection endpiece 10 is heated to close to 1600° C. over a distance L of about 2.5 mm. As in the method described above, a needle 32 having an angle α at its tip of 12° is inserted into the capillary 12 over a distance l of 0.6 mm. Then, once the silica has softened, the needle is pushed in over a distance l' of about 2 mm.

FIG. 6 is a diagram of apparatus for implementing the method described with reference to FIGS. 4 and 5. The apparatus comprises a laser source 50 e.g. a 20 W to 25 W $CO_2$ laser, providing a beam 51 of infrared radiation at a wavelength of 10.6 μm. This beam 51 is enlarged about five times by an expander 52. The beam 53 leaving the expander 52 is applied to a further beam expander 54 designed to produce an output beam 55 which is annular. A plane mirror 56 disposed at 45° to the optical axis Δ is provided with a central hole 57 whose right cross-section seen along the axis Δ is of substantially the same size as the blind inside portion 59 of the annular beam 55. The mirror 56 receives said annular beam around the central hole 57 whose center lies on said first optical axis Δ, and it reflects the beam along the direction of a second optical axis Δ' perpendicular to Δ and also passing through the center of the central hole 57. The reflected beam propagates towards a conical optical component 58 which deflects the annular beam that leaves the mirror 56 onto the end 11 of the endpiece 10 which is placed at the center of said conical optical component 58 and is coaxial with the second axis Δ'.

A needle 32, e.g. made of tungsten, lies along the second optical axis Δ', passes through the central hole 57 in the plane mirror 56 and is applied with controlled pressure P into the capillary 12 of the endpiece 10.

The conical optical component 58 acts as a furnace. However since the needle 32 is never on the path of the beam, it is never directly heated by the laser radiation. However, it does absorb energy by conduction on contact with the endpiece 10, but since this contact takes place for less than 3 seconds the quantity of energy absorbed by the needle remains quite negligible.

In the example shown in FIG. 6, the needle is moved in translation only. However, it could naturally have a component of rotary motion imparted thereto as well without thereby going beyond the scope of the invention.

We claim:

1. A connection endpiece for optical fibers, said endpiece being in the form of a cylindrical rod of outside diameter D and including an internal capillary of diameter $d_i$, one end of the connection endpiece being provided with a guide part constituted by a cylindrical body having formed therein: firstly a cylindrical bore of diameter substantially equal to the diameter D of the endpiece, which bore is delimited inside said cylindrical body by a wall constituting an abutment for the end of said endpiece when the endpiece is inserted into said bore; and secondly a guide hole having at least one inlet cone as a tapering portion opening to the outside of the cylindrical body with a diameter that is greater than the diameter $d_i$, and opening into the cylindrical bore at said capillary with a diameter which is substantially equal to the diameter $d_i$ of the capillary.

2. Apparatus for making an inlet cone at one of the ends of a connection endpiece for optical fibers, said endpiece being in the form of a cylindrical rod of outside diameter D and including an internal capillary of diameter $d_i$, wherein said end is subjected to laser radiation as to soften the material from which said endpiece is made, said apparatus comprising along a first optical axis $\Delta$:
a source of laser radiation, a beam expander, an annular beam expander providing an annular beam, and a plane mirror disposed at 45° to the first optical axis $\Delta$ and receiving said annular beam about a central hole whose center lies on the first optical axis $\Delta$; the annular beam being reflected along a second optical axis $\Delta'$ perpendicular to the first optical axis $\Delta$ and passing through the center of said central hole, the beam being reflected towards a conical optical component which deflects the annular beam from the plane mirror onto the said end of the endpiece, which endpiece is placed in the center of said optical component along the second axis $\Delta'$, and the apparatus further comprising a needle having at least a tapering portion and also disposed on the second optical axis $\Delta'$, passing through the central hole of the plane mirror, and applied with controlled heating and pressure into the capillary of the endpiece.

3. Apparatus for making an inlet cone at one of the ends of a connection endpiece for optical fibers, said endpiece being in the form of a cylindrical rod of outside diameter D and including an internal capillary of diameter $d_i$, wherein said end is subjected to laser radiation as to soften the material from which said endpiece is made, and wherein said endpiece is made of silica and said laser radiation is provided by a $CO_2$ laser, said apparatus comprising along a first optical axis $\Delta$:
a source of laser radiation, a beam expander, an annular beam expander providing an annular beam, and a plane mirror disposed at 45° to the first optical axis $\Delta$ and receiving said annular beam about a central hole whose center lies on the first optical axis $\Delta$; the annular beam being reflected along a second optical axis $\Delta'$ perpendicular to the first optical axis $\Delta$ and passing through the center of said central hole, the beam being reflected towards a conical optical component which deflects the annular beam from the plane mirror onto the said end of the endpiece, which endpiece is placed in the center of said optical component along the second axis $\Delta'$, and the apparatus further comprising a needle having at least a tapering portion and also disposed on the second optical axis $\Delta'$, passing through the central hole of the plane mirror, and applied with controlled heating and pressure into the capillary of the endpiece.

4. A method of making a guide part for a connection endpiece for optical fibers, said endpiece being in the form of a cylindrical rod including an internal capillary, said method comprising the steps of:

forming a cylindrical core provided with a hole, said core representing an end of the connection endpiece including said capillary;

inserting with a calibrated force a needle having at least a tapering portion into said hole representing said capillary, said needle being kept in abutment against said core at an open end of said hole, whereby said core together with said needle form a mold; and molding a guide part material around said mold.

* * * * *